Nov. 9, 1965 S. D. LINDEMUTH 3,216,254
TEMPERATURE COMPENSATING APPARATUS FOR GAS METERS
Filed March 21, 1962 9 Sheets-Sheet 1

INVENTOR
Samuel D. Lindemuth

BY
ATTORNEYS

Nov. 9, 1965  S. D. LINDEMUTH  3,216,254
TEMPERATURE COMPENSATING APPARATUS FOR GAS METERS
Filed March 21, 1962  9 Sheets-Sheet 2

Fig.2

INVENTOR
Samuel D. Lindemuth

BY *Strauch, Nolan & Neale*
ATTORNEYS

Nov. 9, 1965     S. D. LINDEMUTH     3,216,254
TEMPERATURE COMPENSATING APPARATUS FOR GAS METERS
Filed March 21, 1962     9 Sheets-Sheet 4

INVENTOR
Samuel D. Lindemuth

BY *Strauch, Nolan & Neale*

ATTORNEYS

Nov. 9, 1965 S. D. LINDEMUTH 3,216,254
TEMPERATURE COMPENSATING APPARATUS FOR GAS METERS
Filed March 21, 1962 9 Sheets-Sheet 7

INVENTOR
Samuel D. Lindemuth

BY
ATTORNEYS

Nov. 9, 1965        S. D. LINDEMUTH        3,216,254

TEMPERATURE COMPENSATING APPARATUS FOR GAS METERS

Filed March 21, 1962        9 Sheets-Sheet 9

INVENTOR
Samuel D. Lindemuth

BY
*Strauch, Nolan & Neale*
ATTORNEYS

United States Patent Office 3,216,254
Patented Nov. 9, 1965

3,216,254
TEMPERATURE COMPENSATING APPARATUS FOR GAS METERS
Samuel D. Lindemuth, Merritt Island, Fla., assignor to Rockwell Manufacturing Company, Pittsburgh, Pa., a corporation of Pennsylvania
Filed Mar. 21, 1962, Ser. No. 181,384
23 Claims. (Cl. 73—281)

The present invention relates to gas meters and more particularly to improvements in volumetric displacement type gas meters which compensate for temperature variations of the fluid being metered.

With gas meters of the volumetric displacement type, only the volume of fluid passing through the meter is measured. When the fluid is subjected to temperature variations, the weight of a given volume of the fluid will vary owing to the resultant expansion or contraction of the fluid volume. As a consequence, the volumetric measurements made by a displacement type meter do not accurately reflect the amount of fluid being delivered through the meter unless compensated for. Since charges for gas consumed are usually set by reference to gas at a standard or base temperature, it will be appreciated that, unless corrected, variations in gas temperature will be reflected as incorrect charges.

In the past, various temperature compensating devices have been incorporated into the volumetric displacement type gas meters to adjust the meter for recording or indicating the volume of gas being metered at a standard reference temperature. Some of the prior art devices provide for bi-metallic elements which are responsive to the fluid temperature variations for adjusting the meter register drive to thereby compensate for temperature variations. The deflection of such bi-metallic temperature compensating devices, however, is not uniform per degree of temperature change. Thus, these bi-metallic temperature compensating devices do not accurately reflect the temperature of the fluid being metered and, as a consequence, metering inaccuracies result from the changing temperature condition of the fluid.

A further shortcoming of such bi-metallic temperature compensating devices is that the bi-metallic elements do not provide for sufficient power to readily overcome the friction and other resisting forces in the motion transmitting linkages interconnecting the metering diaphragms with the register mechanism. In mounting the bi-metallic elements, one end is usually fixed and the opposite end is free to bend laterally in response to temperature variations to adjust the movement of a motion transmitting linkage. It will be appreciated that such a motion transmitting arrangement requires a bi-metallic element of sufficient thickness to withstand the bending and shearing stresses applied to the element. Bendable bi-metallic elements of proportionately large thickness, however, reduce the accuracy of movement of the elements since the amount of deflection per unit temperature change decreases as the thickness of the element is increased. On the other hand, a comparatively thin bi-metallic element usually is not adequate to impart sufficient motion transmitting force to produce an immediate and accurate displacement of the register drive since the critical bending stress at which the bi-metallic element deforms corresponds to the thickness of the element and is always comparatively small.

In order to overcome the foregoing operational difficulties, the present invention contemplates and has as its purpose a special temperature compensating bellows assembly which accurately reflects slight temperature variations and which provides for a more uniform deflection per unit temperature change to appreciably improve the accuracy of the meter. According to the present invention, the bellows assembly is operative to impart a uniform axial force of adequately sufficient magnitude to overcome the friction and opposing forces in the motion transmitting register drive without deformation of the temperature compensating element.

It is therefore the primary object of the present invention to provide for a novel and improved temperature compensating device in the register drive for a volumetric displacement type gas meter.

Another object of the present invention is to provide a novel automatic thermally sensitive arrangement in the register drive of a gas meter for changing the effective length of the tangent arm in accordance with variations of the gas being measured.

A further object of the present invention is to provide for a novel volumetric displacement gas meter tangent arm assembly having a temperature compensating bellows unit for introducing the necessary compensation factor into the valve mechanism which controls the displacement of the gas meter displacement diaphragm such that the meter register exhibits the volume of fluid flowing through the meter in terms of what the volume would be at a standard reference temperature.

A more specific object of the present invention is to provide for an improved temperature compensated diaphragm gas meter having a tangent pivot post which is movable in a closed circular path by motion transmitting linkages connected to expansible and contractable gas measuring diaphragms, a valve mechanism for controlling the displacement of the diaphragms and operable by a rotatable drive shaft which is connected to the pivot post by a special bellows unit wherein the bellows unit is responsive to the temperature of the gas being metered to vary the distance between the center of the tangent pivot post and the center of the gear drive shaft so as to control the motion of the gas diaphragms to vary the volume of gas displaced thereby and thus compensate the meter for temperature variations in the gas being metered.

A further object of the present invention resides in the provision of a novel volumetric displacement gas meter tangent arm assembly having a temperature compensating bellows unit controlling the distance between the tangent pivot post and the valve gear drive shaft in which the bellows unit is externally supported with the temperature responsive fluid being enclosed within the bellows.

Still another object of the present invention resides in the provision of a novel volumetric displacement gas meter tangent arm assembly having a temperature compensating bellows unit controlling the distance between the tangent pivot post and the valve gear drive shaft in which the bellows unit is internally supported with a casing surrounding the bellows and forming therewith an enclosed chamber confining the temperature responsive fluid.

Still another object of the present invention resides in the provision of a novel volumetric displacement gas meter tangent arm assembly as set forth in the preceding object in which the tangent arm assembly is provided with a section extending into and externally supporting the bellows.

Still a further object of the present invention resides in the provision of a novel volumetric displacement gas meter tangent arm assembly having a temperature compensating bellows unit controlling the distance between the tangent pivot post and the valve gear drive shaft and in which a special motion transmitting arm is operatively disposed between the bellows unit and the tangent arm to magnify the displacement of the tangent arm pivot post in comparison to the motion transmitted by the uniform expansion and compression of the bellows unit.

A further object of the present invention resides in the provision of a novel volumetric displacement gas meter tangent arm assembly as in the preceding object in which the motion transmitting arm is operative to transform linear motion produced by the bellows unit into non-linear motion imparted to the tangent pivot post.

Further objects of the invention will appear as the description proceeds in connection with the appended claims and the annexed drawings wherein:

Figure 1:
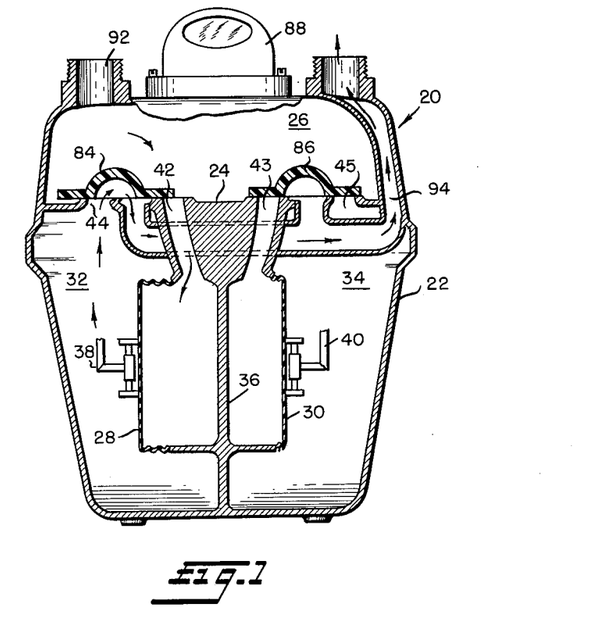
FIGURE 1 is a diagrammatic sectional view of a volumetric displacement meter adapted to incorporate the present invention.

Referring now to the drawings and more particularly to FIGURE 1, the reference numeral 20 designates a diaphragm gas meter adapted to incorporate the various embodiments of the present invention and having a casing 22. The interior of casing 22 is divided by a horizontal valve plate or "gallery table" 24 to separate an upper gas distributing valve chamber 26 from a pair of measuring diaphragms 28 and 30 located below valve plate 24. Diaphragms 28 and 30, diagrammatically shown in FIGURE 1, are conventionally disposed in measuring chambers 32 and 34, respectively, which are separated by a vertical partition 36.

With continued reference to FIGURE 1, flexible diaphragms 28 and 30 are operatively connected to respectively oscillate a pair of vertical flag rods 38 and 40 which extend rotatably upwardly through partition 24 and into chamber 26. Through the operation of conventional motion transmitting linkages, the movement of diaphragms 28 and 30 in response to the flow of gas through ports 42, 43, 44 and 45 causes flag rods 38 and 40 to be oscillated back and forth about their axes at rates proportional to the rate of gas flow.

Figure 2:
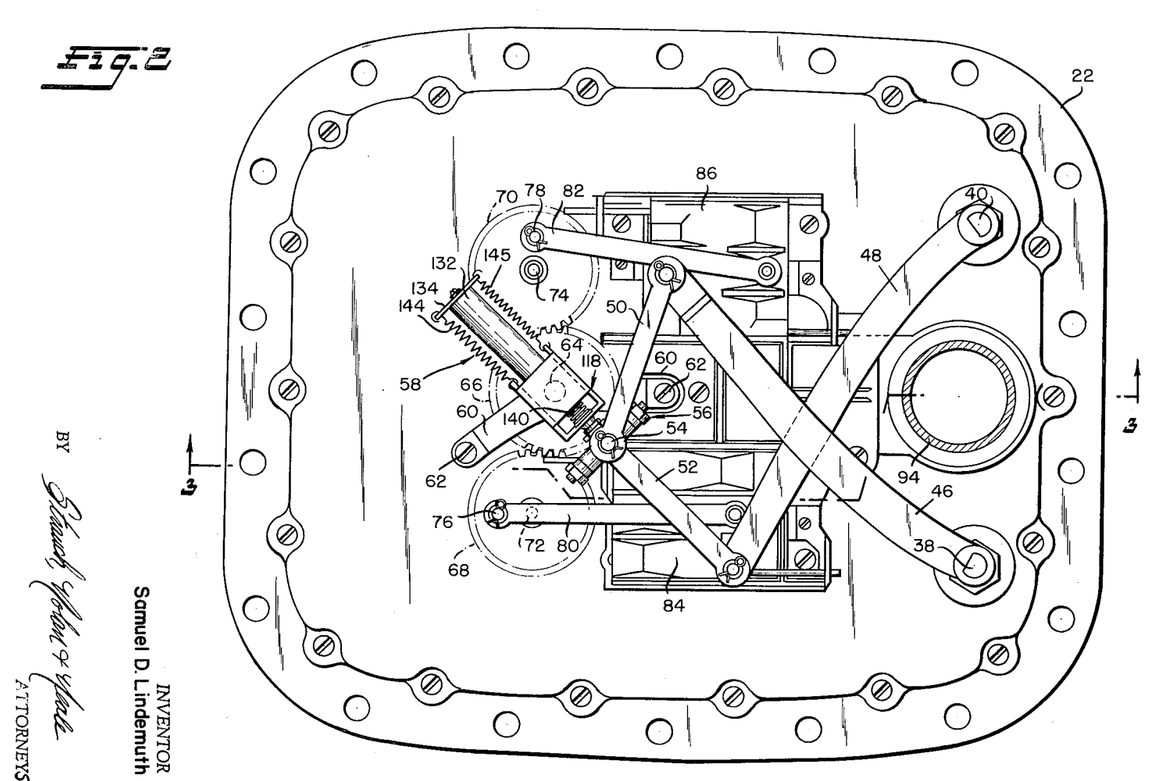
FIGURE 2 is a top plan view of the upper gas distribution chamber of the meter of FIGURE 1 and illustrating a tangent arm assembly according to one embodiment of the present invention.

Referring now to FIGURE 2, a pair of horizontal flag arms 46 and 48 are non-rotatably mounted on the upper ends of flag rods 38 and 40 extending into chamber 26. Arms 46 and 48 are respectively pivotally connected to the corresponding ends of a pair of links 50 and 52. The ends of links 50 and 52 remote from the connections to arms 46 and 48 are pivotally connected to a rigid upstanding tangent pivot post 54 of a tangent arm assembly 56 which will be presently described.

The foregoing description of gas meter 20 is substantially the same as the meter construction disclosed in United States Letters Patent No. 2,818,046, issued December 31, 1957, to H. J. Evans, to which reference is made in the event a more detailed description than that herein given is found necessary for a complete understanding of the invention.

Figure 3:
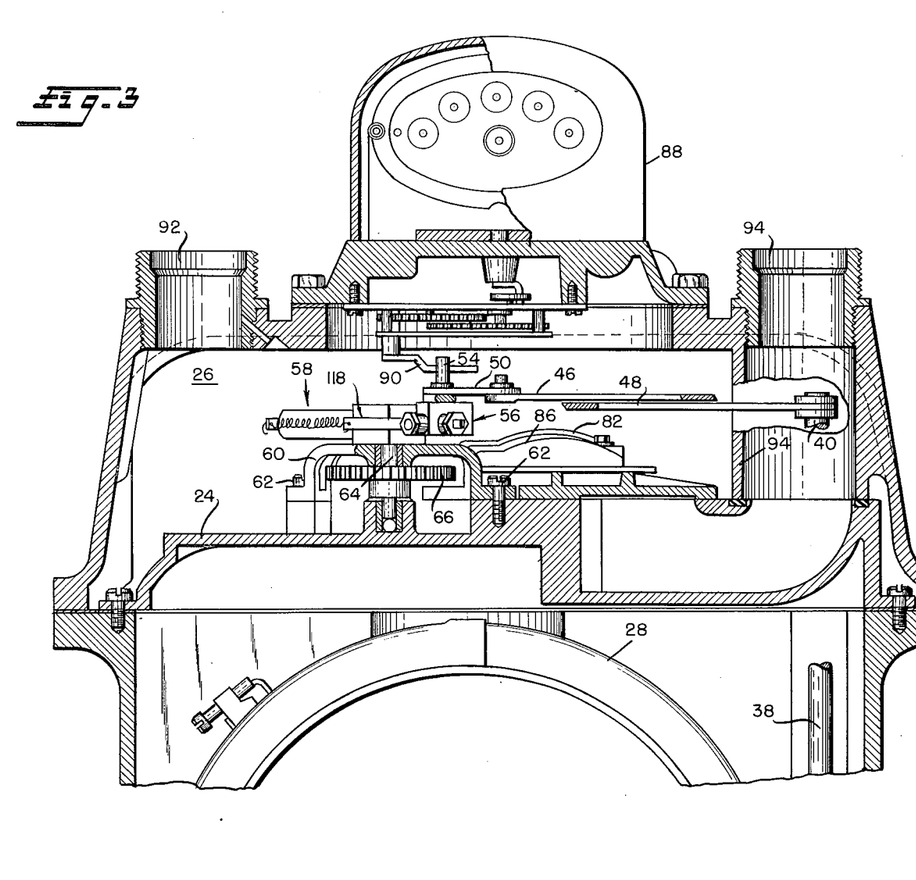
FIGURE 3 is a fragmentary section taken substantially along lines 3—3 of FIGURE 2.

As best shown in FIGURES 2 and 3, tangent assembly 56 is connected through a special temperature compensating bellows unit 58 to a Y-shaped bracket 60 fixed to valve plate 24 as by screws 62 and journalling a vertical valve gear drive shaft 64 (FIGURE 3) about an axis extending parallel to the axis of post 54. Fixed to the lower end of shaft 64 is an intermediate gear 66 which is in constant meshing engagement with diametrically opposed gears 68 and 70 journalled on vertical fixed stub shafts 72 and 74 projecting upwardly from valve plate 24. Gears 68 and 70 respectively eccentrically mount a pair of crank pins 76 and 78 to which corresponding ends of links 80 and 82 are pivotally connected. The opposite ends of links 80 and 82 are respectively pivotally connected to slide valves 84 and 86 which are slidable along ways or guides to respectively control flow of fluid through ports 42, 43 and ports 44, 45 and thereby control the displacement of diaphagms 38 and 40 as schematically shown in FIGURE 1. Specific details of the foregoing valve and gear operating structure are the same as disclosed in said Patent No. 2,818,046.

As shown in FIGURE 3, a conventional register 88 is driven by post 54 which abuttingly engages a displaceable operating arm 90 connected to the usual counter mechanism of the register.

With the structure thus far described, gas enters through an inlet connection 92 (FIGURES 1 and 3) and fills chamber 26. When valves 84 and 86 are in the positions shown in FIGURE 1, port 42 is connected to chamber 26, and port 44 is connected to an exhaust passage 94 to thereby fill diaphragm 28 and permit the gas in chamber 32 to be exhausted through passage 94 by the expansion of diaphragm 28. Valve 86 at the same time closes ports 43 and 45 to respectively prevent the exhaust of gas in chamber 34 and to prevent introduction of gas into diaphragm 30 which is collapsed by the pressure of gas in chamber 34. Alternate expansion and contraction of diaphragms 28 and 30 oscillates flag rods 38 and 40. This motion is transmitted through flag arms 46 and 48 and links 50 and 52 to rotate post 54 in a horizontal closed circular path concentrically about the central axis of shaft 64 in the usual manner. Post 54 pushes arm 90 ahead of it such that register 88 records the number of inflations and deflations of diaphragms 38 and 40.

The circular movement of post 54 is transmitted through tangent assembly 56 and bellows unit 58 to rotate shaft 64 and consequently gears 66, 68 and 70. Rotary motion of gears 68 and 70 is converted into linear movement by links 80 and 82 to shift valves 84 and 86 back and forth and thereby control the expansion and contraction of diaphragms 28 and 30 and displace two equal volumes of gas through exhaust passage 94 for each revolution of post 54 as fully described in Patent No. 2,818,046.

With the foregoing structure, it is clear that the tangent arm length between tangent post 54 and shaft 64 effectively controls the volumetric displacement of gas through diaphragms 28 and 30. Bellows unit 58, as will presently be described in detail changes the effective tangent arm length between post 54 and shaft 64 to vary the throw of flag arms 46 and 48 in accordance with temperature variations in the gas being measured. As a result, the volumetric displacement of diaphragms 28 and 30 is correspondingly adjusted to vary the volume of gas delivered, thereby correcting the register reading to volume at standard temperature.

Figure 4:
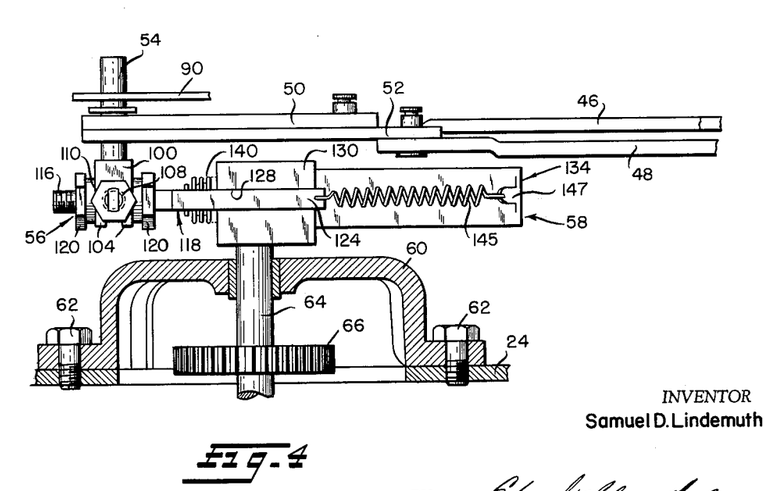
FIGURE 4 is an enlarged partially sectioned elevational view of the tangent arm assembly illustrated in FIGURES 2 and 3 showing the tangent arm turned approximately 180 degrees.
Figure 5:
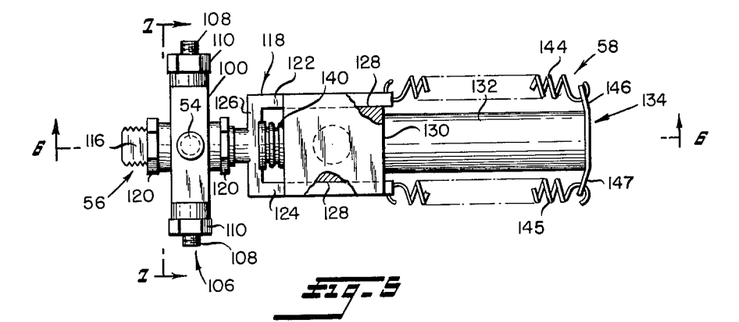
FIGURE 5 is a partially sectioned top plan view of the tangent arm assembly shown in FIGURE 4.
Figure 6:
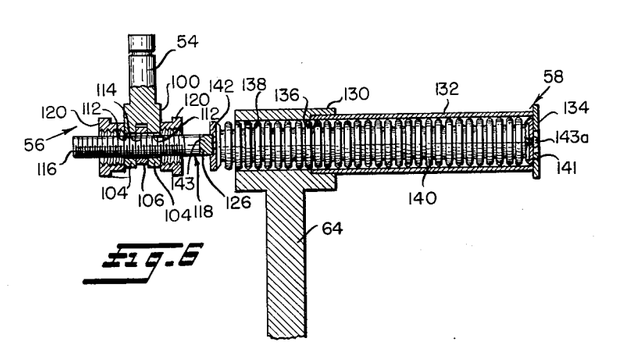
FIGURE 6 is a section taken substantially along lines 6—6 of FIGURE 5.

Referring now to FIGURES 4-6, tangent arm assembly 56 comprises a tangent mounting block 100 in which post 54 is fixed and which has a downwardly facing groove forming parallel spaced apart guides 104 (FIGURE 6) below post 54 and extending at right angles to the longitudinal axis thereof. Received between guides 104 with a tight slidable fit is a flat sided adjusting bar 106 having threaded end sections 108 which extend beyond block 100 at both ends. Screw nuts 110 are threadedly mounted on end sections 108 for adjusting bar 106 to a fixed longitudinal position between guides 104.

Figure 7:
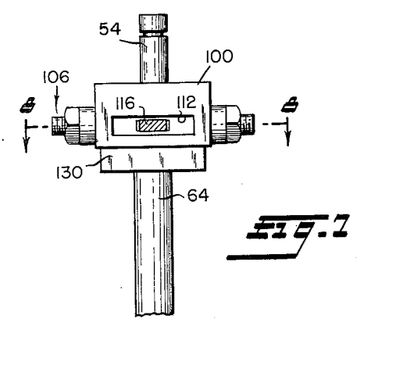
FIGURE 7 is a section taken substantially along lines 7—7 of FIGURE 5.
Figure 8:
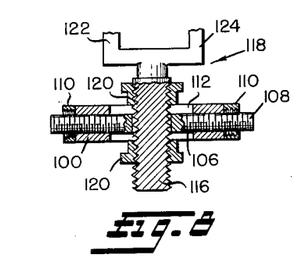
FIGURE 8 is a section taken substantially along lines 8—8 of FIGURE 7.

As best shown in FIGURES 6-8, block 100 is formed with aligned elongated apertures 112 in guides 104. An aperture 114 formed in an intermediate section of adjusting bar 106 registers with apertures 112 in assembled relationship. Extending through apertures 112 and 114 is a threaded elongated flat sided shank portion 16 of a one-piece tangent arm 118 which extends normal to the axis of post 54 and to the longitudinal axis of adjusting bar 106. Aperture 114 is of just sufficient size to receive shank 116 and is shorter than apertures 112. Securing tangent arm 118 in a fixed adjusted position are a pair of lock nuts 120 threadedly received on shank 116, one on each side of block 100.

Specific details of the foregoing tangent adjustment are disclosed in United States Patent No. 1,723,397 to Armstrong.

In accordance with the present invention tangent arm 118 is preferably formed as one piece and has a pair of parallel spaced apart guide arms 122 and 124 which are joined together by a perpendicularly extending cross piece 126 formed rigid with shank 116 as best shown in FIGURE 5.

Guide arms 122 and 124 are interfittingly and slidably received in slots 128 formed in the smooth side surfaces of a flat sided mounting block 130 which is mounted rigidly with shaft 64 at the upper end thereof.

With continuing reference to FIGURES 5 and 6 the bellows unit 58 is arranged to shift the center of pivot post 54 radially away from the fixed center of gear shaft 64 and comprises an outer metal cylindrical thin walled shell 132 which is closed at one end by a plate 134 and which has an open end 136. Plate 134 is fixed to shell 132 as by soldering. The open end 136 of shell 132 is fixedly seated in a counterbored portion of a bore 138 which extends through block 130 at right angles to shaft 64 and to pivot post 54. Axially supportingly received in shell 132 is a flexible corrugated bellows 140 which is closed at both ends.

As viewed from FIGURE 6, bellows 140 is provided with an end wall 141 having an outwardly directed flat face abutting the interior face of plate 134. The portion of bellows 140 extending beyond the open end of shell 132 coaxially projects through bore 138 and has an end wall 142 formed with a guide slot 143 which interfittingly receives cross-piece 126 of tangent arm 118.

As shown, bellows 140 is preferably sealed to form a closed chamber for containing a temperature responsive fluid or liquid such as acetone. The fluid is initially introduced into bellows 140 through a threaded opening which is formed in end wall 141 and which is sealed by a screw 143a. Screw 143a extends freely through an aperture formed in plate 134.

Bellows 140 is axially retained between cross-piece 126 and plate 134 by means of a pair of constant deflection coil springs 144 and 145 which extend parallel to the longitudinal axis of bellows 140 on both sides thereof. The right-hand ends of springs 144 and 145, as viewed from FIGURE 5, are secured to oppositely extending apertured tabs 146 and 147 formed rigid with plate 134. The left-hand ends of springs 144 and 145 are respectively secured to the free ends of guide arms 122 and 124 which extend slightly beyond slots 128. Springs 144 and 145 are in tension to continuously urge tangent arm 118 and consequently, pivot post 54 radially toward gear shaft 64 against the restraining force of bellows 140, thereby compressing bellows 140 by a predetermined magnitude. As a result of the biasing force exerted by springs 144 and 145, end wall 141 of bellows 140 is axially retained in abutment with plate 134 and end wall 142 is axially retained in abutment with cross-piece 126 to hold bellows 140 in place.

By means of this construction, it will be appreciated that bellows 140 provides for an axially flexible motion transmitting connection between post 54 and shaft 64 which is responsive to the temperature variations of the gas being metered. As the temperature of the gas which fills chamber 26 changes, bellows 140 responds to the temperature variations of the gas to change the radius of the closed path in which tangent post 54 rotates by a proportional magnitude, thus altering the throw of flag arms 46 and 48 as previously explained.

The sliding movement of guide arms 122 and 124 in slots 128 enables tangent arm 118 and tangent post 54 to be displaced radially with respect to gear shaft 64 as post 54 is revolved around gear shaft 64 by the expansion and contraction of diaphragms 28 and 30 as previously explained. The engagement of guide arms 122 and 124 in slots 128 causes block 130 and shaft 64 to rotate about the axis of shaft 64 to operate valves 84 and 86.

As the temperature of gas in chamber 26 increases, bellows 140 responds by expanding axially away from end plate 134 to thereby displace tangent arm 118 and, consequently, tangent post 54 radially outwardly from the center of gear shaft 64 against the bias of springs 144 and 145 and by a magnitude proportional to the gas temperature increase.

As a consequence of increasing the radius of the circular path in which post 54 travels around gear shaft 64, the distance traveled by flag arms 46 and 48 is increased to cause a corresponding increase in the magnitude of oscillation of flag rods 38 and 40. By increasing the magnitude of oscillation of flag rods 38 and 40, the magnitude of displacement of diaphragms 28 and 30 is allowed to increase. By increasing the magnitude by which diaphragms 28 and 30 are permitted to expand, the volumes of gas introduced and exhausted for each cycle of operation, which is represented by one complete revolution of gear shaft 64, is increased in proportion to the increase in the radius of the closed path in which tangent post 54 travels. Thus for each cycle of operation which is represented by one complete revolution of gear shaft 64 and in which diaphragms 38 and 40 each fill and exhaust once, the volume of gas delivered by the meter is increased in proportion to the gas temperature increase to thereby compensate for the temperature increase.

As the gas temperature decreases, bellows 140 responds by axially contracting to allow tangent post 54 to be drawn radially closer to gear shaft 64 by springs 144 and 145 and thereby decrease the radius of the circular path in which post 54 travels. This action reduces the throw of flag arms 46 and 48 to thereby reduce the magnitude of displacement of diaphragms 28 and 30. Under these conditions, smaller volumes of gas will be introduced and exhausted from diaphragms 28 and 30 to thereby compensate for the temperature decrease of the gas being measured.

Bellows 140, therefore, accurately adjusts the radial position of post 54 relative to gear shaft 64 to thereby control the volume of gas which is passed through the meter for each cycle of operation.

It will be appreciated that since the expansion and contraction of bellows 140 is uniform per given unit of temperature change, the radial dispacement of tangent post 54 also is uniform to provide for an accurate control of diaphragms 28 and 30 and of valves 84 and 86 in response to gas temperature variations.

The effective length of tangent arm 118 may also be manually adjusted by loosening nuts 120 and moving arm 118 into or out of block 100. Arm 118 is centered by removing nuts 110 and shifting bar 106.

Figures 9, 12:
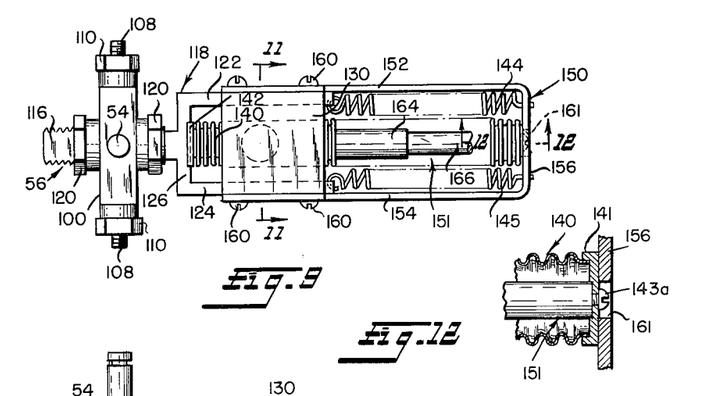
FIGURE 9 is a partially sectioned top plan view of a tangent arm assembly according to a further embodiment of the present invention.
FIGURE 12 is a section taken substantially along lines 12—12 of FIGURE 9.
Figure 10:
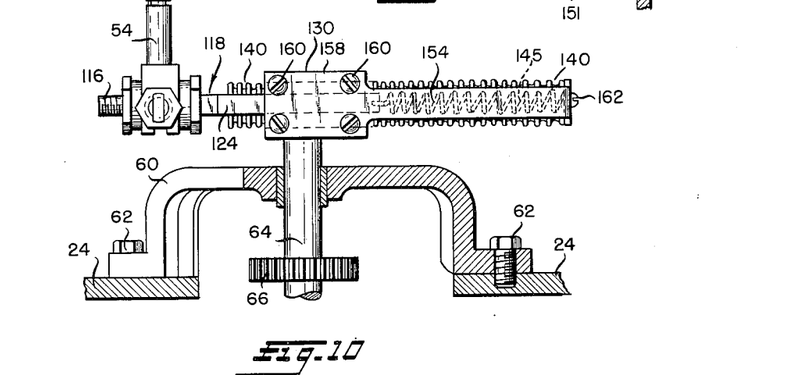
FIGURE 10 is a partially sectioned side elevational view of the tangent arm assembly shown in FIGURE 9.
Figure 11:
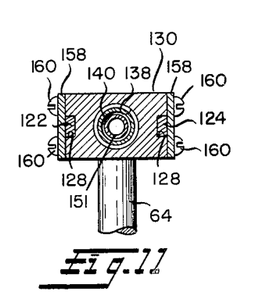
FIGURE 11 is a section taken substantially along lines 11—11 of FIGURE 9.

In the embodiment shown in FIGURES 9–12, shell 132 and end plate 134 are replaced by a rigid one-piece U-shaped bracket 150 and an internal bellows support assembly 151. As best shown in FIGURE 9, bracket 150 has parallel arms 152 and 154 connected together by a cross-piece 156 extending mutually perpendicularly between arms 152 and 154. The ends of arms 152 and 154 terminate in enlarged flat-sided plate portions 158 which interfittingly abut the side wall surfaces of block 130 over slots 128 and which are fixed to block 130 as by screws 160. The right-hand ends of springs 144 and 145 (as viewed from FIGURES 9 and 10) are secured to cross-piece 156. The opposite ends of springs 144 and 145 are secured to arms 122 and 124 as previously described. Cross-piece 156 is formed with an aperture 161 (FIGURE 12) which freely receives sealing screw 143a of bellows 140.

By means of the foregoing bracket construction, guide arms 122 and 124 of tangent arm 118 are allowed to freely slide back and forth in slots 128 and bellows 140 reacts against the cross-piece of bracket 150 to radially displace tangent pivot post 54 inwardly and outwardly relative to the rotational axis of gear shaft 64 in response to temperature variations of the gas being metered as hereinbefore described.

Support assembly 151 is mounted coaxially within bellows 140 and comprises, as best shown in FIGURE 9, two rigid telescoping tubular members 164 and 166 having their opposite ends suitably retained by end walls 141 and 142 against movement transversely of bellows 140. Members 164 and 166 axially support bellows 140 to prevent lateral bending and deformation while at the same time enabling bellows 140 to uniformly expand and contract in response to changes in the temperature of the gas being metered.

Figure 13:
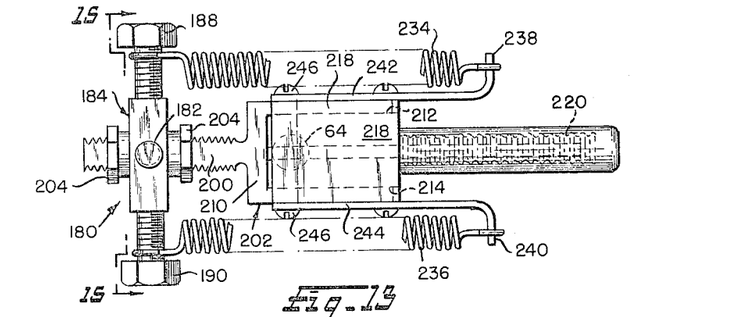
FIGURE 13 is a top plan view of a tangent arm assembly according to still another embodiment of the present invention.
Figures 14, 15, 16, 17:
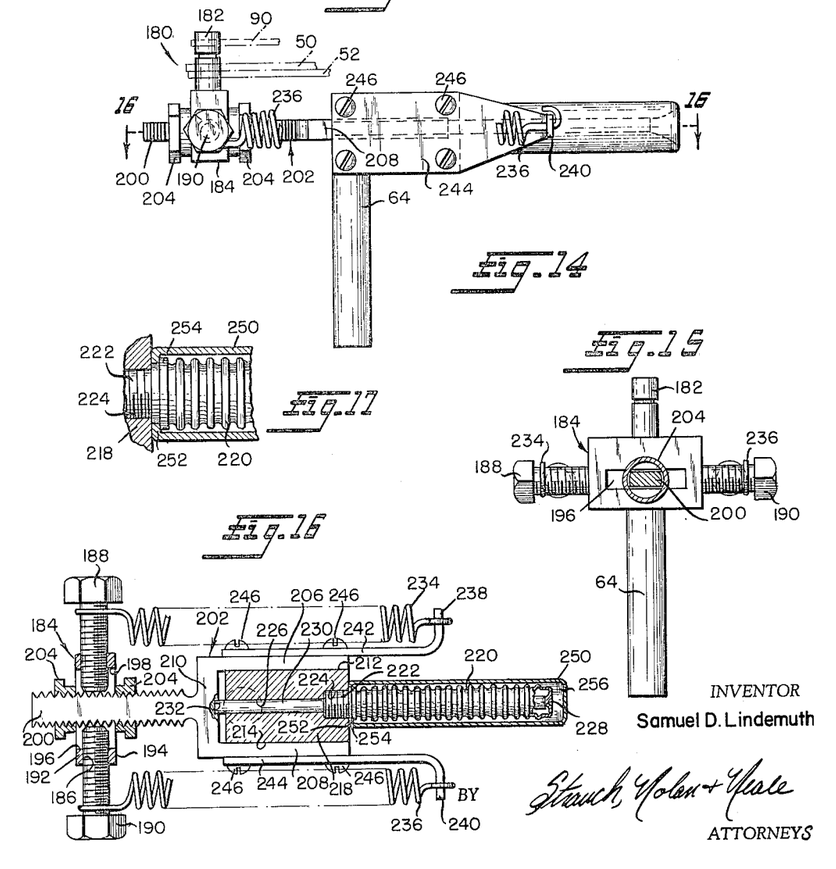
FIGURE 14 is a side elevational view of the tangent arm assembly shown in FIGURE 13.
FIGURE 15 is a section taken substantially along lines 15—15 of FIGURE 13.
FIGURE 16 is a section taken substantially along lines 16—16 of FIGURE 14.
FIGURE 17 is an enlarged fragmentary view of FIGURE 16 showing the bellows mounting and bellows chamber sealing construction.

FIGURES 13–17 illustrate a modified tangent arm assembly 180 for meter 20. As shown in FIGURES 13 and 14, tangent arm assembly 180 comprises a rigid upstanding tangent pivot post 182 to which links 50 and 52 are pivotally connected and which abuttingly engages the register operating arm 90.

With reference to FIGURES 13 and 16, tangent pivot post 182 is fixed to and extends upwardly from a block 184 having a through bore 186 which extends normal to the axis of post 182 and which is threaded to receive machine screws 188 and 190 at opposite ends thereof.

Block 184, as shown in FIGURE 16, is formed with opposed flat side walls 192 and 194 having aligned slots 196 and 198 communicating with bore 186. Extending freely through slots 196 and 198 and substantially prependicularly through bore 186 is a threaded elongated flat sided shank portion 200 of a one-piece tongent arm 202. Shank portion 200 is provided with flat top and bottom surfaces and threaded side faces. Slots 196 and 198 are appreciably longer than the width of shank portion 200 to permit adjustable movement of tangent arm 202 generally axially of bore 186. The height of slots 196 and 198 is of just sufficient magnitude to freely slidably receive shank portion 200 to allow free movement of shank portion 200 in slots 196 and 198.

With continued reference to FIGURE 16, shank portion 200 extends between the opposed ends of screws 188 and 190 which are threadedly advanced inwardly into abutting engagement with the threaded sides of shank portion 200 to retain tangent arm 202 against sideward or lateral movement in a direction extending axially of bore 186. By manipulation of screws 188 and 190, the position of post 182 may be adjusted relative to the longitudinal axis of tangent arm 202. Securing tangent arm 202 against transverse movement relative to bore 186 are a pair of lock nuts indicated at 204 which are threadedly received on shank portion 200 on each side of block 184.

In accordance with the present invention, tangent arm 202 is preferably formed as one piece and has a pair of parallel spaced apart guide arms 206 and 208 which are joined together by a perpendicularly extending cross-piece 210 formed rigid with shank portion 200. Guide arms 206 and 208 are interfittingly and slidably received in grooves 212 and 214 formed inwardly of smooth side faces of a flat-sided tangent mounting block 218 which is fixedly mounted on the upper end of valve gear shaft 64 in a manner as described in the embodiments of FIGURES 1–12.

For controlling the radial displacement of tangent pivot post 182 relative to shaft 64 and thereby compensating for variations in the temperature of the gas being metered, an axially flexible corrugated bellows 220 is provided for. Bellows 220 differs from bellows unit 140 of FIGURES 1–12 in that the temperature responsive fluid or liquid is confined externally around the bellows instead of being disposed within the bellows.

With continued reference to FIGURES 16 and 17, bellows 220 is open at its left-hand end and has a hollow externally threaded boss 222 securely fixed to the open end thereof. Boss 222 is threadedly received in a tapped counterbore portion 224 of a smooth walled bore 226 formed in block 218. The longitudinal axis of bellows 220 aligns with the axis of bore 226.

The right-hand end of bellows 200 is closed by a wall 228 with bellows 220 axially receiving a rigid rod 230 which extends through boss 222 and slidably through bore 226. The end of rod 230 projecting beyond the left-hand end of bore 226 is received in a guide recess 232 formed in cross-piece 210 of tangent arm 202. Rod 230 is continuously biased into abutment with bellows end wall 228 by means of a pair of constant deflection coil springs 234 and 236 which extend parallel to the longitudinal axis of bellows 220 and on both sides thereof.

The left-hand ends of springs 234 and 236 are secured to the threaded shanks of screws 188 and 190 respectively. The right-hand ends of springs 234 and 236 are respectively secured to apertured ear portions 238 and 240 formed integral with a pair of mounting plates 242 and 244 which are fixed as by screws, indicated at 246, to the flat opposed side wall surfaces of blocks 218 to completely cover grooves 212 and 214.

As best shown in FIGURES 13 and 16, ears 238 and 240 are bent at right angles to plates 242 and 244 to provide for the axially aligned mounting of springs 234 and 236. By this construction, guide arm 206 and 208 are allowed to freely slide back and forth with grooves 212 and 214 and springs 234 and 236 react to urge rod 230 into axial abutment with bellows end walls 228 to thereby axially retain rod 230 between cross-piece 210 and end wall 228.

Bellows 220 axially extends into a hollow cylindrically shaped metal shell 250 which is closed at its outer end and which has its inner open end formed with an annnular lip 252 as best shown in FIGURE 17. Lip 252 is turned radially inwardly and is sealingly pressed between mounting block 218 and an annular flange portion 254 formed rigid with bellows 220 adjacent to the outer end of boss 222. With this construction, lip 252 is pressed snugly between mounting block 218 and flange portion 254 by threading boss 222 into counterbore 224 to form a peripheral seal between shell 250 and bellows 220 and in surrounding relationship to the open inner end of bellows 220. Lip 252 preferably is soldered to flange portion 254. Thus, bellows 220 is arranged for axial expansion and contraction in shell 250 and forms with shell 250 a closed fluid chamber 256 (FIGURE 16) which is filled with a suitable temperature responsive fluid such as acetone. As the volume of fluid in chamber 256 increases and decreases with corresponding variations in the temperature of the gas being metered, it reacts against bellows 220 to cause bellows 220 to expand and contract. Expansion and contraction of bellows 220 displaces rod 230 in bore 226. Upon increase in temperature of the gas being metered, rod 230 is displaced outwardly toward pivot post 182 to increase the radial distance between shaft 64 and pivot post 182. When the temperature of the gas being metered decreases, rod 230 is shifted into bellows 220 under the bias of springs 234 and 236 allow springs 234 and 236 to draw pivot post 182 radially closer to shaft 64.

Figure 18:
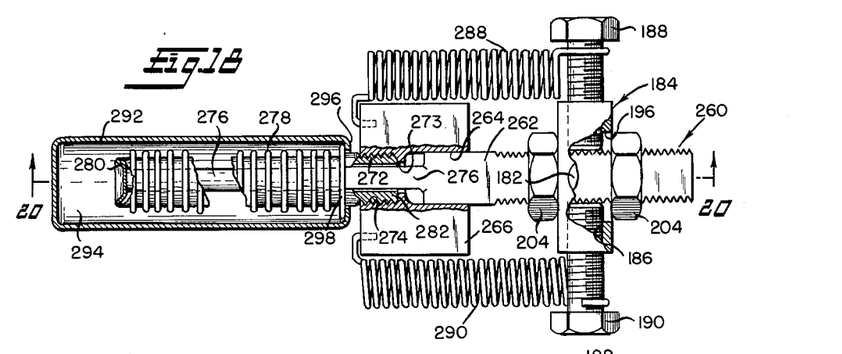
FIGURE 18 is a partially sectioned top plan view of a tangent arm assembly according to still another embodiment of the present invention.
Figure 19:
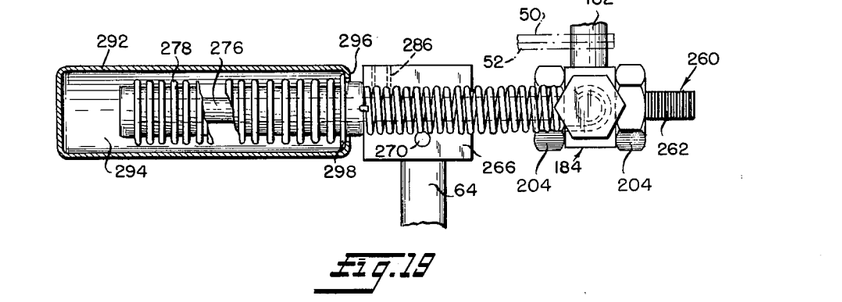
FIGURE 19 is a partially sectioned side elevational view of the tangent arm assembly shown in FIGURE 18.
Figure 20:
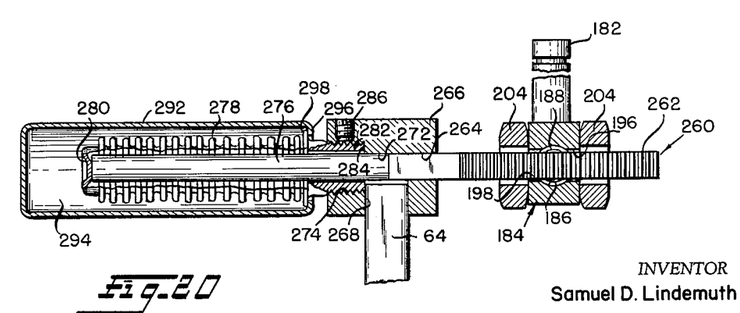
FIGURE 20 is a section taken along lines 20—20 of FIGURE 18.

FIGURES 18-20 illustrate another embodiment of a temperature compensating tangent arm assembly in which the temperature compensating bellows is surrounded by a confined body of temperature responsive fluid. In this embodiment, a modified one-piece tangent arm 260 is provided with an elongated shank portion 262 having flat top and bottom surfaces and threaded side faces. Shank portion 262 extends freely through slots 196 and 198 and transversely through bore 186 of tangent pivot post block 184 in the manner described in the embodiment illustrated in FIGURES 13-17. Screws 188 and 190 are threadedly advanced inwardly into abutting engagement with threaded sides of shank portion 262 to retain tangent arm 260 against movement axially of bore 186 in the same manner as described in the embodiment of FIGURES 13-17.

The left-hand end of shank 262, as viewed from FIGURES 18-20, is provided with smooth flat sides and interfittingly slidably projects into a flat-sided recess 264 formed in a tangent mounting block 266. Block 266 is formed with a vertical bore 268 (FIGURE 20) which receives valve gear shaft 64 and is securely fixed to shaft 64 as by a set screw 270 (FIGURE 19).

Extending from the base of recess 264 to the opposite side face of block 266 is a stepped bore 272 formed along an axis extending normal to shaft 64 and aligned with the longitudinal axis of recess 264. Stepped bore 272 is formed with a small diametered smooth walled bore section 273 and a large diametered tappered bore section 274 to provide with recess 264 a coaxial passage through block 266.

As best shown in FIGURES 18 and 20, tangent arm 260 is provided with a rod-like plunger section 276 which is integral with shank portion 262 and which slidably extends through bore section 273 and freely through bore section 274. Plunger section 276 projects beyond the side face of block 266 and is coaxially received through the open end of a corrugated flexible bellows 278. Bellows 278 is provided with a closed end wall 280 which abuts with outer end of plunger section 276. At its opposite end, bellows 278 has a hollow externally threaded boss portion 282 which is threadedly received in bore section 274. Boss portion 282 has a smooth flat-sided outer end face extending normal to the axis of bore 272 and abutting an annular shoulder 284 (FIGURE 20) formed between bore sections 273 and 274. Boss portion 282 is secured in place in bore section 274 by means of a set screw 286 (FIGURE 20).

Plunger section 276 is biased into abuttting engagement with end wall 280 by means of a pair of springs 288 and 290 in a manner similar to that described in the embodiment of FIGURES 13-17. The ends of springs adjacent to tangent pivot post 182 are secured to the threaded shanks of screws 188 and 190 respectively. The opposite ends of springs 288 and 290 are turned inwardly and are received in bores formed in mounting block 266 such that springs 288 and 290 react to urge tangent pivot post 182 toward gear shaft 64.

Bellows 278 is coaxially received in a hollow cylindrically shaped thin metal shell 292 having an open end through which boss portion 282 extends. The opposite end of shell 292 is closed to form a chamber 294 with the exterior corrugated wall surface of bellows 278.

The open end of shell 292 is provided with a radially inwardly turned annular lip 296 which bears against the smooth surface of a flat-sided radially extending flange portion 298 formed rigid with bellows 278 adjacent to boss portion 282. Lip 296 is preferably soldered to flange portion 298 to thereby provide for a fluid tight seal for enclosing bellows 278 in chamber 294.

The operation of the tangent arm temperature compensating tangent assembly shown in FIGURES 18-20 is essentially the same as that described in connection with the tangent arm assembly illustrated in FIGURES 13-17. As the fluid in chamber 294 expands upon an increase in the temperature of the gas being metered, the increase in volume of the fluid in chamber 294 compresses bellows 278 to axially displace tangent arm 260 to the right as viewed from FIGURES 18-20. This displacement of tangent arm 260 shifts pivot post 182 radially away from shaft 64. When there is a decrease in the temperature of the gas being metered, the volume of fluid in chamber 294 correspondingly decreases to allow bellows 278 to expand thereby shifting tangent arm 260 to the left as viewed from FIGURES 18-20 under the bias of springs 288 and 290 to shift tangent pivot post 182 radially closer to shaft 64.

Figure 21:
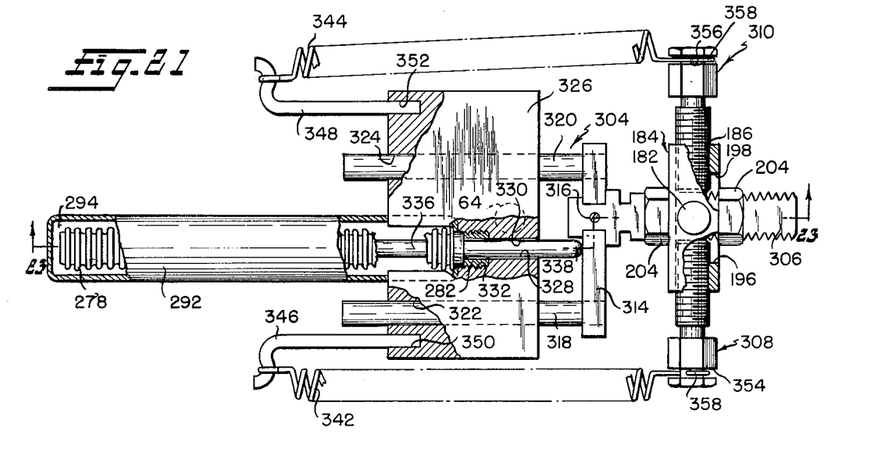
FIGURE 21 is a partially sectioned top plan view of a tangent arm assembly according to still another embodiment of the present invention.
Figure 22:
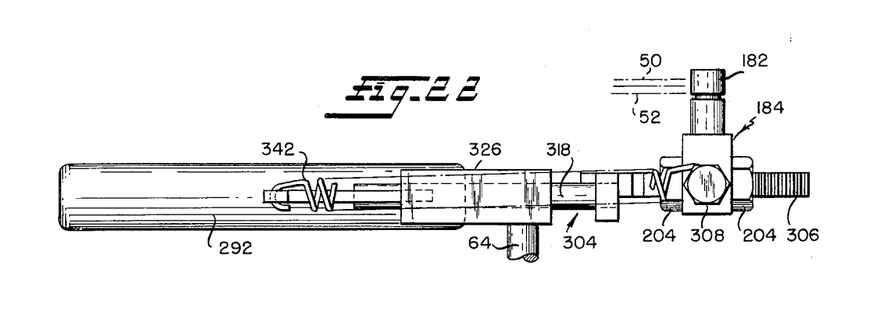
FIGURE 22 is a side elevational view of the tangent arm assembly illustrated in FIGURE 21.
Figure 23:
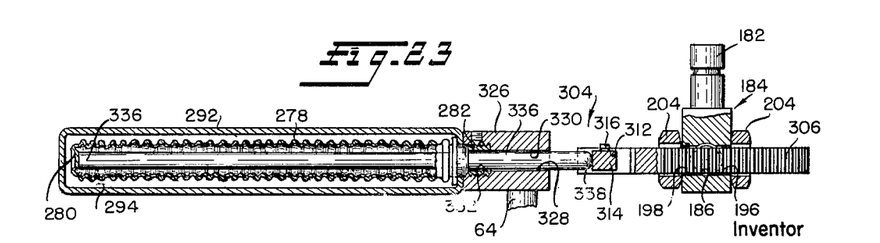
FIGURE 23 is a section taken substantially along lines 23—23 of FIGURE 21.

FIGURES 21-23 illustrate still another embodiment of a temperature compensating tangent arm assembly in which the temperature compensating bellows is surrounded by a confined body of temperature responsive fluid and which is internally supported. In this embodiment, a modified tangent arm 304 mounts the pivot post block 184 previously described, and is provided with a separately formed elongated shank 306 having flat top and bottom surfaces and threaded side faces. Shank 306 extends through slots 196 and 198 and transversely through bore 186 of pivot post block 184 to mount pivot post block 184 in a manner similar to the embodiment illustrated in FIGURES 18-20. Pivot post block 184 is retained longitudinally in place on shank 306 by means of nuts 204 threadedly engaging shank 306 and abutting opposed side faces of block 184 in the manner shown. Specially formed machine screws 308 and 310, to be presently described in detail, are threadedly received in opposite ends of bore 186 to abut the opposed threaded side face portions of shank 306 disposed in bore 186 and thus retain tangent arm 304 against movement axially with respect to bore 186.

With continued reference to FIGURES 21-23, shank 306 is formed with a slot 312 at its end to the left of pivot post block 184. Extending through slot 312 in transverse relationship to shank 306 is a cross-piece 314 which is fixed to shank 306 by means of a set screw 316 (FIGURES 21 and 23). Cross-piece 314 fixedly carries two guide arms 320 and 318 which are of rod-like shape and which extend along axes parallel to the longitudinal axis of shank 306 on opposite sides thereof. Guide arms 318 and 320 respectively extend in a direction facing away from pivot post block 184 and slidably through parallel spaced apart smooth walled bores 322 and 324 formed in a tangent arm mounting block 326 which supports tangent arm 304.

With continued reference to FIGURES 21–23, mounting block 326 is fixedly mounted on the upper end of valve gear shaft 64 in the manner previously described in the embodiment of FIGURES 18–20 and is formed with a stepped through bore 328 extending between bores 322 and 324 in parallel realtionship therewith. Stepped bore 328 is formed with a small diametered smooth walled bore section 330 and a coaxial large diametered tapped bore section 332 to provide a passage extending completely through mounting block 326.

As best shown in FIGURES 21 and 23, the boss portion 282 of bellows 278 previously described in the embodiment of FIGURES 18–20 is threadedly received in bore section 332 to mount bellows 278 on mounting block 326 with the longitudinal axis of bellows 278 in alignment with the axis of bore 328 in a manner similar to that described in connection with the embodiment of FIGURES 18–20. Bellows 278 coaxially receives a rigid cylindrically shaped plunger 336 which slidably extends through boss 282 and which abuts end wall 280 of bellows 278. Plunger 336 coaxially and slidably extends through bore section 330 and terminates at its right-hand end extending beyond mounting block 336 in the rounded end 338 which separably abuttingly engages cross-piece 314 between guide arms 318 and 320.

As shown in FIGURES 21 and 23, shank 306 is secured to cross-piece 314 in offset relationship between plunger 336 and guide arm 320.

Biasing plunger 336 into engagement with end wall 280 of bellows 278 at one end and into engagement with cross-piece 314 at its opposite end are a pair of constant deflection coil springs 342 and 344 which extend along axes slightly inclined with respect to the longitudinal axis of bellows 278 on opposite sides thereof. The left-hand ends of springs 342 and 344 are respectively secured to rod-like members 346 and 348 having straight shank portions received in parallel bores 350 and 352. Bores 350 and 352 are formed in mounting block 326 inwardly of the side surface thereof facing away from pivot post mounting block 184 and in parallel relationship with the longitudinal axis of bore 328. Bore 352 is disposed laterally outwardly with respect to bore 324 and bore 350 is disposed laterally outwardly with respect to bore 322.

To secure the right-hand ends of springs 342 and 344, the heads of screws 308 and 310, which are enlarged, are respectively formed with annular grooves 354 and 356. Springs 342 and 344 are provided with hooked ends indicated at 358 which are seatingly received in grooves 354 and 356, thus securing the right-ends of springs 342 and 344 to screws 308 and 310 respectively. With this construction, it is clear that springs 342 and 344 bias pivot post 182 radially toward valve gear shaft 64 and maintain plunger 336 in abutment with cross-piece 314 and end wall 280 of bellows 278.

The operation of the tangent arm assembly illustrated in FIGURES 21–23 is essentially the same as that described with the previous embodiments. The temperature of the gas being measured increases, the temperature responsive fluid in chamber 294 expands to axially compress bellows 278. With axial compression of bellows 278 plunger 336 is axially displaced by bellows 278 toward pivot post 182. Since plunger 326 is in continuous abutting engagement with cross-piece 314 of tangent arm 304, displacement of plunger 326 toward pivot post 182 causes tangent arm 304 to be displaced to the right, as viewed from FIGURES 21–23, with guide arms 318 and 320 being slidably displaced in bores 322 and 324 of mounting block 326. This displacement of tangent arm 304 displaced pivot post 182 carried by tangent arm 304 to increase the radial distance between shaft 64 and pivot post 182. When the temperature of the gas being measured is decreased, bellows 278 expands under the reduced pressure exerted by the fluid in chamber 294 to allow plunger 326 to axially shift in a direction extending away from pivot post 182. As a result, pivot post 182 is shifted under the bias of springs 342 and 344 radially closer to shaft 64.

FIGURES 24–27 illustrate a further embodiment of the present invention in which a tangent arm assembly 370 is provided with a motion transmitting force proportionating arm 372 for increasing the magnitude of displacement of pivot post 182 with respect to the magnitude of axial expansion and contraction of bellows 278.

In this embodiment of FIGURES 24–27, the tangent arm 202 essentially as described in the embodiment of FIGURES 13–17 mounts the tangent pivot post block 184 with screws 308 and 310 being carried by block 184 for securing the corresponding ends of springs 342 and 344 respectively as described in the embodiment illustrated in FIGURES 21–23. The opposite ends of springs 342 and 344 are secured to members 346 and 348 in the manner described in the embodiment of FIGURES 21–23 with members 346 and 348 being fixedly secured to a mounting block 374. Grooves 376 and 378 formed inwardly of oppositely facing smooth side surfaces of block 374 slidably receive guide arms 206 and 208 of tangent arm 202 in the same manner as described in the embodiment of FIGURES 13–17.

With continued references to FIGURES 24–27, mounting block 374 is fixedly mounted on the upper end of valve gear shaft 64 in the manner previously described in the embodiment of FIGURES 18–20 and is formed with a stepped through bore 380 having an axis extending in parallel relation to the longitudinal axis of shank 200 but being offset to one side of the axis of shank 200 in the manner shown. Stepped bore 380 is formed with a small diametered smooth walled bore section 382 and a large diametered tapped bore section 384 to provide a passage extending completely through mounting block 374 in the same manner as described in the embodiment of FIGURES 21–23.

Figure 24:
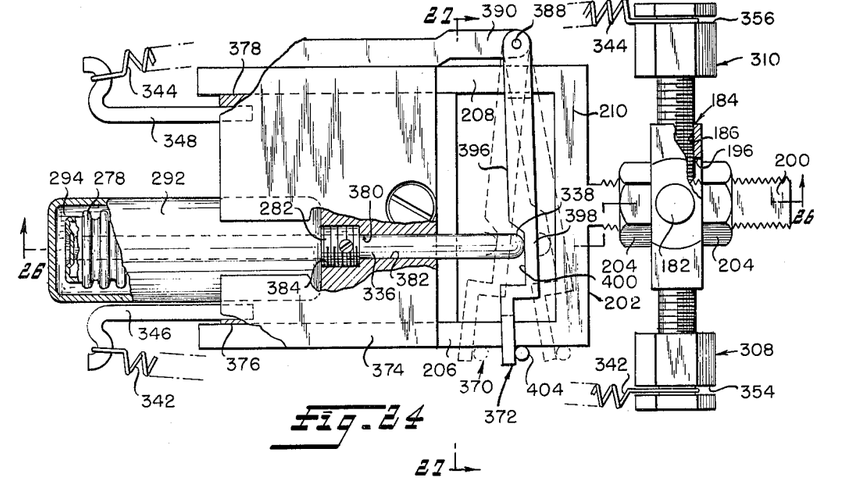
FIGURE 24 is a partially sectioned top plan view of a tangent arm assembly according to still another embodiment of the present invention in which a force proportioning motion transmitting arm is operatively disposed between the bellows unit and the tangent arm.
Figure 26:
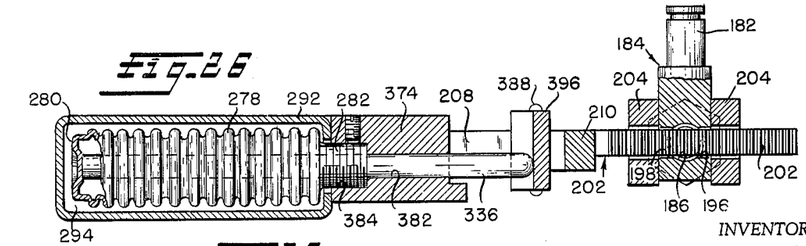
FIGURE 26 is a section taken substantially along lines 26—26 of FIGURE 24.

As best shown in FIGURES 24 and 26, the boss portion 282 of bellows 278 previously described in the embodiments of FIGURES 18–23, is threadedly received in bore section 384 to mount bellows 278 on mounting block 374 in a manner similar to that described in connection with the embodiments of FIGURES 18–23. The cylindrically shaped plunger 336 illustrated in FIGURES 24–26 extends slidably through boss 282 and abuts the end wall 280 of bellows 278 in the same manner as described in the embodiment of FIGURES 21–23. Plunger 336 slidably and coaxially tends through bore section 382 and is positioned with its right-hand rounded end 338 (as viewed from FIGURES 24–26) in separable abutting engagement with force proportionating arm 372.

Figure 25:
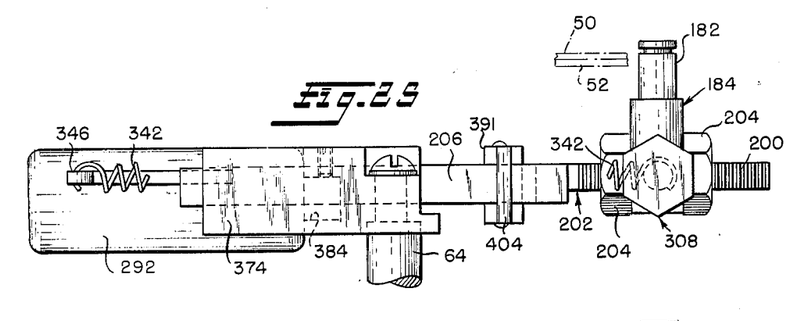
FIGURE 25 is a side elevational view of the tangent arm assembly illustrated in FIGURE 24.

With continued reference to FIGURES 24–26, force proportionating arm 372 provides the motion transmitting connection between plunger 336 and tangent arm 202. Arm 372 is pivotally mounted by means of a pin 388 for free swinging displacement about an axis extending at right angles to the longitudinal axis of tangent arm shank 200 and the axis of plunger 336. The axis of pin 388 about which arm 372 is swingable is offset outwardly from guide arm 208 and mounting block 374. Pin 388 is carried by an extension piece 390 formed rigid with mounting block 374.

Figure 27:
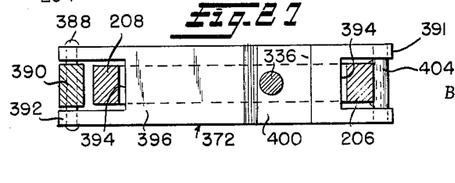
FIGURE 27 is a section taken substantially along lines 27—27 of FIGURE 24.

As best shown in FIGURE 27 force proportionating arm 372 extends transversely with respect to guide arms 206 and 208 and is provided with oppositely facing bifurcated ends 391 and 392 to form outwardly opening recesses indicated at 394 through which guide arms 206 and 208 freely extend. Force proportioning arm 372 is provided with a flat-sided intermediate section 396 integrally joining its bifurcated ends 391 and 392 and extending between guide arms 206 and 208. Intermediate section 396 is formed with portion 398 which is offset longitudinally with respect to the remainder of section 396. Offset portion 398 has a flat side surface 400 and abuttingly engaging the rounded end 338 of plunger 336. With arm 372 positioned in perpendicular relationship to the longitudinal axis of plunger 336, surface 400 is contained in a plane which is also perpendicular to the axis of plunger 336.

The outer end of bifurcated end 391 of arm 372 remote from pivot pin 388 abutting engages a rod-like member 404 fixed to guide arm 206 and extending along an axis substantially parallel to the axis of pin 388.

With the foregoing pivoted motion transmitting arm construction, it is clear that axial displacement of plunger 336 resulting from expansion and contraction of bellows 278 swings arm 372 about the axis of pin 388. Springs 342 and 344 bias plunger 336 into continuous engagement with surface 400 of arm 372 to maintain arm 372 in continuous separable surface abutment with plunger 336. As a consequence, the uniform displacement of plunger 336 resulting from uniform expansion and contraction of bellows 278 is transmitted through arm 372 to linearly displace tangent arm 202 and pivot post 182 radially with respect to valve gear shaft 64.

By engaging arm 372 with plunger 336 at a region between the pivot axis of pin 388 and the region at which arm 372 engages member 404, it is evident that the magnitude of displacement of tangent arm 202 will be magnified in comparison to the amount of displacement of plunger 336. The resulting magnitude of displacement of tangent arm 202 will be substantially proportional to the ratio of the effective lever arm lengths extending between pin 388 and member 404, and between pin 388 and plunger 336. By magnifying the displacement of tangent arm 202 and, consequently, pivot post 182 in this manner, it will be appreciated that the radial displacement of pivot post 182 is more sensitive to temperature variations in the gas being measured. As a result of this increased sensitivity, a more accurate control of the displacement of diaphragms 28 and 30 is achieved.

Figure 28:
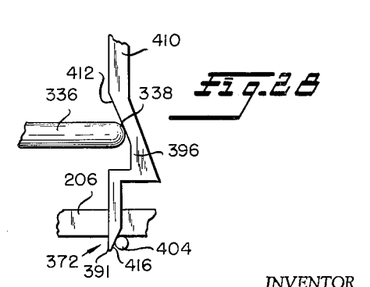
FIGURE 28 is an enlarged fragmentary plan view illustrating the tangent arm assembly shown in FIGURE 24 but with a modified form of a force proportionating arm which imparts non-liear motion in response to uniform expansion and compression of the bellows unit.

In the embodiment illustrated in FIGURE 28, force proportioning arm 372 is provided with a modified intermediate section 410 having a side surface 412 facing and abuttingly engaging the rounded end 338 of plunger 336. With arm 372 positioned at right angles to the longitudinal axis of plunger 336, surface 412 slopes at an acute angle with a plane extending perpendicularly with respect to the longitudinal axis of plunger 336. Thus, by swinging arm 372 about its axis of pin 388, the rounded end 338 of plunger 336 will engage different points on surface 412 corresponding to the different angular positions of arm 372. As a result of sloping surface 412, more or less displacement of plunger 336 is transmitted to tangent arm 202 to thereby de-linearize the linear motion produced by the uniform expansion and compression of bellows 278. Thus, non-linear motion is imparted to tangent pivot post 184 to compensate for other factors introduced as a result of measuring the flow of gas through the meter, thereby achieving a desired control of the displacement of diaphragms 28 and 30.

It will be appreciated that surface 412 may be provided with any selected configuration, such as a curved configuration to impart a particular form of non-linear motion to pivot post 182 as a result of the uniform expansion and compression of bellows 278.

In addition or as an alternate to sloping or curving surface 412, the bifurcated end 391 may be provided with a sloped camming side surface indicated at 416. Surface 416 faces and separable abuttingly engages member 404 and slopes at an acute angle with respect to the longitudinal axis of plunger 336. As a result, it is clear that member 404 will engage different regions on surface 416 corresponding to different angular positions of arm 372 to transform the linear motion of plunger 336 into a non-linear motion. Surface 416 may also be otherwise curved as with surface 412 to impart a desired form of non-linear motion to pivot post 182.

With all of the foregoing embodiments illustrated in FIGURES 1–28 it is evident that an extremely compact arrangement is obtained by respectively disposing the bellows element and the tangent arm together with register drive post on oppositely facing sides of the valve gear shaft mounting block. As a result, the tangent arm assemblies described in each of the embodiments of FIGURES 1–28 may be easily mounted in the comparatively small space provided by chamber 26 without requiring re-arrangement of the other component parts of the meter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter having drive mechanism actuated by the fluid being metered, temperature compensated register drive means comprising a pivot member mounted for rotation about a fixed axis, a tangent arm slidably mounted directly on said pivot member for displacement at right angles to said axis, means comprising a post on the tangent arm for pivotally connecting said drive mechanism to said tangent arm for rotating said tangent arm about the axis of said pivot member, a thermally responsive axially expansible and contractible bellows interposed between said tangent arm and said pivot member and comprising a flexible bellows element fixed at one end to said pivot member and having an axially solid motion transmitting connection between its other end and said tangent arm, and resilient means connected between said tangent arm and said pivot member biasing said tangent arm in the direction for contracting said bellows comprising a pair of parallel tension springs disposed on opposite sides of said axis.

2. In a gas meter having drive mechanism actuated by the fluid being metered, temperature compensated register drive means comprising a pivot member mounted for rotation about a fixed axis, a tangent arm slidably mounted directly on said pivot member for displacement at right angles to said axis, means comprising a post on the tangent arm for pivotally connecting said drive mechanism to said tangent arm for rotating said tangent arm about the axis of said pivot member, a thermally responsive axially expansible and contractible bellows interposed between said tangent arm and said pivot member, said bellows having a longitudinal axis intersecting said axis of the pivot member and also the pivot axis of said post and having one end axially fixed on said pivot member at the side opposite said post, means connecting the other end of said bellows to said tangent arm, and resilient means connected between said tangent arm and said pivot member biasing said tangent arm in the direction for contracting said bellows.

3. In the gas meter defined in claim 2, said means connecting the other end of the bellows to said tangent arm comprising an axially rigid element extending through said bellows and said pivot member.

4. In the gas meter defined in claim 2, said bellows being detachably connected at one end to said tangent arm.

5. In a gas meter having drive mechanism actuated by the fluid being metered, temperature compensated register drive means comprising a pivot member mounted for rotation about a fixed axis, a tangent arm slidably mounted directly on said pivot member for displacement at right angles to said axis, means comprising a post on the tangent arm for pivotally connecting said drive mechanism to said tangent arm for rotating said tangent arm about the axis of said pivot member, a thermally responsive axially expansible and contractible bellows interposed between said tangent arm and said pivot member, said bellows having one end axially fixed to said pivot member and extending away from said pivot member in the direction opposite to said tangent post, a push rod extending within said bellows and slidably through said pivot member into abutment with said tangent arm, and resilient means connected between said tangent arm and said pivot member biasing said tangent arm in the direction for contracting said bellows.

6. In a gas meter having drive mechanism actuated by the fluid being metered, temperature compensated register drive means comprising a pivot member mounted for rotation about a fixed axis, a tangent arm slidably mounted directly on said pivot member for displacement at right angles to said axis, means comprising a post on the tangent arm for pivotally connecting said drive mechanism to said tangent arm for rotating said tangent arm about the axis of said pivot member, a thermally responsive axially expansible and contractible bellows interposed between said tangent arm and said pivot member, said bellows and tangent arm being connected by mechanism that magnifies axial displacement of said tangent arm, and resilient means connected between said tangent arm and said pivot member biasing said tangent arm in the direction for contracting said bellows.

7. In a gas meter having drive mechanism actuated by the fluid being metered, temperature compensated register drive means comprising a pivot member mounted for rotation about a fixed axis, a tangent arm assembly having a pair of laterally spaced parallel arms slidably mounted on said pivot member at right angles to said axis, said parallel arms being disposed at opposite sides of said axis, a thermally responsive axially expansible and contractible bellows assembly interposed between said tangent arm and said pivot member, and balanced resilient means connected between said tangent arm assembly and said pivot member at opposite sides of said axis biasing said tangent arm in the direction to contract said bellows assembly comprising a pair of parallel tension springs connected at opposite ends to said tangent arm assembly and said pivot member.

8. In a gas meter having drive mechanism actuated by the fluid being metered, temperature compensated register drive means comprising a pivot member mounted for rotation about a fixed axis, a tangent arm assembly having spaced parallel arms slidably mounted directly on said pivot member for displacement at right angles to said axis, means pivotally connecting said drive mechanism to said tangent arm assembly for rotating said tangent arm assembly about the axis of said pivot member, a support structure rigidly projecting from said pivot member in the opposite direction from said tangent arm assembly, a through passage in said pivot member, a thermally responsive expansible and contractible bellows extending through said support structure and said passage so as to be interposed between said tangent arm assembly and said pivot member, and spring means connected between said tangent arm assembly and the outer end of said support structure biasing said tangent arm in the direction to contract said bellows.

9. In the gas meter defined in claim 8, said support structure being a hollow tube enclosing one end of said bellows.

10. In a gas meter having drive mechanism actuated by the fluid being metered, temperature compensated register drive means comprising a pivot member mounted for rotation about a fixed axis, a tangent arm assembly having a pair of spaced parallel arms slidably mounted directly on said pivot member for displacement at right angles to said axis, said parallel arms being disposed at opposite sides of said axis, a thermally responsive axially expansible and contractible bellows assembly having one end secured to said pivot member, means providing a slide bore in said pivot member, axially rigid means axially fixed with respect to said tangent arm extending slidably through said bore and through said bellows assembly into abutment with the other end of said bellows assembly, balanced resilient means connected between said tangent arm assembly and said pivot member at opposite sides of said axis biasing said tangent arm assembly in the direction to contract said bellows.

11. In the gas meter defined in claim 10, said axially rigid means comprising a push rod detachably connected to said tangent arm assembly.

12. In the gas meter defined in claim 10, means defining a tubular housing projecting from said pivot member and enclosing said bellows assembly, said housing defining a space surrounding said bellows assembly for receiving temperature responsive fluid for actuating said bellows assembly.

13. In a gas meter having drive mechanism actuated by the fluid being metered, temperature compensated register drive means comprising a pivot member mounted for rotation about a fixed axis, a tangent arm assembly having a pair of laterally spaced parallel arms slidably mounted on said pivot member for displacement at right angles to said axis, said parallel arms being disposed at opposite sides of said axis, a tubular housing fixed at one end to said pivot member and projecting away therefrom in the opposite direction from said tangent arm assembly, a thermally responsive axially expansible and contractible bellows enclosed within said housing and having an open end axially fixed to said pivot member and a closed end free within said tubular housing, a push rod extending from said free end of the bellows through the bellows and slidably through said pivot member into operative engagement with said tangent arm assembly, and laterally spaced parallel tension spring means connected between said tangent arm assembly and said pivot member.

14. In the gas meter defined in claim 13, said tangent arm assembly comprising a pivoted lever in abutment with one end of said push rod whereby displacement of said push rod by said expanding bellows results in increased displacement of said tangent arm assembly against the tension of said spring means.

15. A tangent assembly for a volumetric displacement type gas meter comprising:
(a) a pivot member rotatably mounted about a fixed axis;
(b) a tangent arm mounted for rotation with said member and carrying a register drive post radially displaced from said axis;
(c) said tangent arm being displaceable toward and away from said axis to enable the distance between said post and said axis to be varied;
(d) an axially expansible and contractible bellows element operably connected to said tangent arm for displacing said arm and said post with respect to said axis in response to temperature variations of the gas being measured by said meter;
(e) means internally supporting one end of said bellows element on said pivot member in transverse relation to said axis;
(f) means mounted rigid with said pivot member in surrounding relationship to said bellows element and forming therewith an enclosed chamber in which a body of temperature responsive fluid is confined;
(g) axially rigid means extending from the other end of said bellows element slidably through said pivot member; and (h) tension spring means interposed between said pivot member and said tangent arm.

16. A tangent assembly for a volumetric displacement type gas meter comprising:
 (a) a pivot member rotatably mounted about a fixed axis;
 (b) a tangent arm mounted for rotation with said member and carrying a register drive post radially displaced from said axis;
 (c) said tangent arm being displaceable toward and away from said axis to enable the distance between said post and said axis to be varied;
 (d) an axially expansible and contractible bellows element operably connected to said tangent arm for displacing said arm and said post with respect to said axis in response to temperature variations of the gas being measured by said meter;
 (e) said tangent arm being integrally provided with an axially rigid motion transmitting portion extending through said pivot member and into said bellows element in abutting engagement with an end wall portion formed on said bellows element in transverse relationship to the axis of expansion and contraction of said bellows element; and
 (f) tension spring means interposed between said pivot member and said tangent arm.

17. A tangent assembly for a volumetric displacement type gas meter comprising:
 (a) a pivot member rotatably mounted about a fixed axis;
 (b) a tangent arm mounted for rotation with said member and carrying a register drive post radially displaced from said axis;
 (c) said tangent arm being displaceable toward and away from said axis to enable the distance between said post and said axis to be varied;
 (d) an axially expansible and contractable bellows element operably connected to said tangent arm for displacing said arm and said post with respect to said axis in response to temperature variations of the gas being measured by said meter;
 (e) a motion transmitting element displaceable by expansion and contraction of said bellows element;
 (f) a pivoted arm engaged by said motion transmitting element and operatively engaging said tangent arm with said pivoted arm being swingable about a fixed axis by displacement of said first-mentioned element to impart motion to said tangent arm;
 (g) said pivoted arm engaging said tangent arm with an effective lever arm length which is different from the effective lever arm length for said motion transmitting element to thereby provide a different displacement of said tangent arm for a given displacement of said motion transmitting element; and
 (h) tension spring means interposed between said pivot member and said tangent arm.

18. A tangent assembly for a volumetric displacement type gas meter comprising:
 (a) a pivot member rotatably mounted about a fixed axis;
 (b) a tangent arm mounted for rotation with said member and carrying a register drive post radially displaced from said axis;
 (c) said tangent arm being displaceable toward and away from said axis to enable the distance between said post and said axis to be varied;
 (d) an axially expansible and contractible bellows element operably connected to said tangent arm for displacing said arm and said post with respect to said axis in response to temperature variations of the gas being measured by said meter;
 (e) said bellows element being formed to transmit linearized motion;
 (f) motion transmitting means interconnecting said bellows element with said tangent arm to impart a predetermined non-linearized motion to said tangent arm; and
 (g) tension spring means interposed between said pivot member and said tangent arm.

19. In a gas meter of the volumetric displacement type having a flag rod motion transmitting linkage connected to a measuring displacement mechanism, a tangent arm assembly comprising:
 (a) a pivot member rotatable about a fixed axis;
 (b) a tangent arm supported by said pivot member for slidable radial displacement with respect to said fixed axis and carrying;
 (c) a register drive post connected to said flag rod motion transmitting linkage and being operable by operation of said displacement mechanism to revolve in a closed path around said fixed axis;
 (d) an axially expansible and contractible bellows element operably connected to said tangent arm for varying the radial distance between said drive post and said axis in response to variations of the gas temperature being measured to control the volume of gas displaced by said displacement mechanism;
 (e) said bellows element being mounted on said support member with its longitudinal axis aligning with the radial direction of displacement of said tangent arm;
 (f) a shell member fixed to said pivot member in surrounding relationship to said bellows element and forming a chamber with said bellows element;
 (g) said chamber containing a body of temperature responsive fluid in intimate contact with said bellows elements; and
 (h) tension spring means biasing said tangent arm toward said axis.

20. The gas meter defined in claim 19 comprising:
 (a) a plunger member extending into said bellows element in motion transmitting engagement therewith,
 (b) said plunger member slidably extending through said pivot member and engaging said tangent arm to transmit motion imparted by the axial expansion and contraction of said bellows element.

21. In a gas meter of the volumetric displacement type having a measuring displacement mechanism connected by a motion transmitting linkage to a register drive post, a tangent arm assembly comprising:
 (a) a pivot member rotatable about a fixed axis,
 (b) motion transmitting means carrying said drive post for movement in a closed path around said fixed axis by operation of said displacement mechanism, and
 (c) an axially and uniformly expansible and contractible bellows element connected to said motion transmitting means and being responsive to temperature variations of the gas being measured to vary the distance of said drive post from said fixed axis to control the volume of gas displaced by said displacement mechanism,
 (d) said motion transmitting means including variable leverage mechanism operable to proportionate the magnitude of radial displacement of said drive post relative to a given axial variation imparted by said bellows element.

22. The gas meter defined in claim 21 wherein said motion transmitting means comprises:
 (a) a tangent arm slidably supported by said pivot member and carrying said drive post,
 (b) an axially rigid motion transmitting element displaceable in opposite directions by the axial expansion and contraction of said bellows element, and
 (c) a force proportionating arm swingable about a fixed axis on said pivot member extending substantially perpendicular to the longitudinal axis along which said bellows element expands and contracts and engaging said motion transmitting element and tangent arm at separate regions spaced at different predetermined distances from its fixed axis.

23. In a gas meter of the volumetric displacement type having a measuring displacement mechanism connected by a motion transmitting linkage to a register drive post, a tangent arm assembly comprising:
(a) a pivot member rotatable about a fixed axis,
(b) motion transmitting means carrying said drive post for movement in a closed path around said fixed axis by operation of said displacement mechanism, and
(c) an axially and uniformly expansible and contractible bellows element connected to said motion transmitting means and being responsive to temperature variations of the gas being measured to vary the distance of said drive post from said fixed axis to control the volume of gas displaced by said displacement mechanism,
(d) said motion transmitting means being operable to de-linearize the uniform axial expansion and contraction of said bellows element for non-linearly varying the displacement of said drive post with respect to said fixed axis.

References Cited by the Examiner
UNITED STATES PATENTS

| | | | |
|---|---|---|---|
| 2,131,729 | 10/38 | Fee | 74—601 |
| 2,818,046 | 12/57 | Evans | 73—260 X |
| 2,897,650 | 8/59 | Carlson et al. | 60—52 |
| 3,002,499 | 10/61 | Schultz | 91—376 |
| 3,069,927 | 12/62 | Douglass et al. | 74—600 |

RICHARD C. QUEISSER, *Primary Examiner.*
BROUGHTON G. DURHAM, *Examiner.*